(12) United States Patent
Krishnamurthy et al.

(10) Patent No.: US 8,457,079 B2
(45) Date of Patent: Jun. 4, 2013

(54) METHOD AND APPARATUS FOR MITIGATING DOWNLINK CONTROL CHANNEL INTERFERENCE

(75) Inventors: Sandeep Krishnamurthy, Arlington Heights, IL (US); Robert Love, Barrington, IL (US); Vijay Nangia, Algonquin, IL (US); Ravikiran Nory, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 804 days.

(21) Appl. No.: 12/573,590

(22) Filed: Oct. 5, 2009

(65) Prior Publication Data

US 2011/0080896 A1    Apr. 7, 2011

(51) Int. Cl.
*H04J 3/00*    (2006.01)
*H04J 3/06*    (2006.01)

(52) U.S. Cl.
USPC ........................... 370/336; 370/503; 370/520

(58) Field of Classification Search
USPC .......................................................... 370/336
See application file for complete search history.

(56) References Cited

U.S. PATENT DOCUMENTS

| | | | |
|---|---|---|---|
| 5,920,551 A | | 7/1999 | Na et al. |
| 6,463,261 B1 * | | 10/2002 | Hiramatsu et al. ........... 455/63.1 |
| 7,492,754 B2 * | | 2/2009 | Terasawa et al. ............. 370/350 |
| 7,596,105 B2 * | | 9/2009 | Sezgin et al. ................. 370/280 |
| 8,379,752 B2 * | | 2/2013 | Kleider et al. ................ 375/267 |
| 2003/0002537 A1 * | | 1/2003 | Schaller ........................ 370/503 |
| 2003/0147655 A1 * | | 8/2003 | Shattil ........................... 398/182 |
| 2004/0223467 A1 | | 11/2004 | Hundal et al. |
| 2006/0120408 A1 * | | 6/2006 | Willenegger ................. 370/508 |
| 2008/0267318 A1 * | | 10/2008 | Ihm et al. ...................... 375/299 |
| 2008/0285670 A1 * | | 11/2008 | Walton et al. ................. 375/260 |
| 2009/0207814 A1 * | | 8/2009 | Ishii et al. ..................... 370/335 |
| 2009/0252075 A1 | | 10/2009 | Ji et al. |
| 2010/0067502 A1 * | | 3/2010 | Willenegger ................. 370/336 |
| 2010/0080166 A1 * | | 4/2010 | Palanki et al. ................ 370/315 |
| 2010/0091724 A1 * | | 4/2010 | Ishii et al. ..................... 370/329 |
| 2010/0097948 A1 * | | 4/2010 | Barberis ....................... 370/252 |
| 2010/0226318 A1 * | | 9/2010 | Nishio et al. ................. 370/329 |
| 2010/0322115 A1 * | | 12/2010 | Wei et al. ...................... 370/280 |

FOREIGN PATENT DOCUMENTS

| | | |
|---|---|---|
| EP | 2077632 A2 | 7/2009 |
| WO | 2005062798 A2 | 7/2005 |

OTHER PUBLICATIONS

Motorola; "Reducing HeNB Interference to Macro eNB Control Channels"; 3GPP TSG RAN WG4 Meeting #52; Shenzhen, CN; Aug. 24, 2009.

NTT DOCOMO; "Downlink Interference Coordination Between eNodeB and Home eNodeB"; TSG-RAN Working Group 4 (Radio) meeting #52; Shenzhen; Aug. 24, 2009.

(Continued)

*Primary Examiner* — Guang Li

(57) ABSTRACT

A method (300) and apparatus (200) that mitigates downlink control channel interference is disclosed. The method can include receiving (320) a transmission from a network entity and determining (330) a first timing offset to transmit a downlink subframe based on the transmission received from the network entity. The method can include receiving (340) an uplink transmission from a mobile terminal and determining (350) a second timing offset based on the first timing offset and based on the received uplink transmission. The method can include transmitting (360) a timing advance command to the mobile terminal, the timing advance command including the second timing offset.

6 Claims, 7 Drawing Sheets

OTHER PUBLICATIONS

Motorola; "Heterogeneous Support for Reliable Downlink Control"; 3GPP TSG-RAN WG4 Meeting #52; Shenzhen, China, Aug. 24, 2009.

Patent Cooperation Treaty, "PCT Search Report and Written Opinion of the International Searching Authority" for International Application No. PCT/US2010/048059 Apr. 27, 2011, 18 pages.

3GPP TSG RAN WG1 52bis, R1-081381 "Dynamic Range of Downlink Power Setting" Texas Instruments, Shenzhen, China, Mar. 31-Apr. 4, 2008, 4 pages.

3GPP TSG RAN WG1 #52, R1-081013 "Clarifications on cell specific RS power boosting" NEC Group, Sorrento, Italy, Feb. 11-15, 2008, 4 pages.

* cited by examiner

METHOD AND APPARATUS FOR MITIGATING DOWNLINK CONTROL CHANNEL INTERFERENCE

BACKGROUND

1. Field

The present disclosure is directed to a method and apparatus for mitigating downlink control channel interference. More particularly, the present disclosure is directed to mitigating the problem of downlink interference from a high power base station when a lower power base station is deployed within the coverage area of the high power base station.

2. Introduction

Presently, in telecommunications, a heterogeneous cell, such as a Closed Subscriber Group (CSG) cell, a hybrid cell, a femtocell, a picocell, a relay node, or other heterogeneous cell can use a small coverage cellular base station that can, for example, be used in residential or small business environments. It connects to a service provider network via a wired or wireless backhaul connection. Some heterogeneous cells allow service providers to extend service coverage indoors, especially where access would otherwise be limited or unavailable. A heterogeneous cell can also provide services to the user that may not be available on a conventional macro cell, such as, for example, mobile television services or less expensive calling plan services. The heterogeneous cell incorporates the functionality of a typical base station but extends it to allow a simpler, self-contained deployment.

For example, heterogeneous cells, such as CSG cells or hybrid cells, are cells used for deployment in a campus or are individual cells used for deployment in users' homes. The heterogeneous cells co-exist with macro cells and have a smaller coverage area than macro cells. Unlike macro cells, the heterogeneous cells are unplanned, in that the operator has much less control over their placement and configuration than with macro cells.

Unfortunately, a heterogeneous cell can experience downlink interference from a high power base station (eNB) for a macro-cell when a lower power home cell base station is deployed within the coverage area of the high power eNB.

For example, co-channel and shared channel home-eNB (HeNB) deployments, where at least a part of the deployed bandwidth, is shared with macro-cells are considered to be high-risk scenarios from interference point-of-view. When a terminal, such as wireless user equipment, associated with, such as, connected to or camped on, a HeNB and the HeNB is deployed close to a macro-eNB (MeNB), the MeNB transmissions can severely interfere with the terminal transmissions to the HeNB. Also, in-band decode and forward relaying involves relay nodes (RN) deployed on the same carrier as the overlay macro-cell. In order to enable backwards compatibility, all the common control channels need to be transmitted on RN downlink.

Typically, a MeNB transmits at much higher power, such as 46 dBm for 10 MHz, relative to a heterogeneous-eNB (Het-eNB or HeNB), such as 30 dBm for RN and 20 dBm for a HeNB for 10 MHz. Therefore, the coverage of MeNB is typically larger and there exists a region, the so called exclusion zone, around the MeNB within which the transmissions from the HeNB are interfered if a terminal happens to be connected to/camped on the HeNB. This can lead to problems both in connected mode and in idle mode such as 1) the terminal being unable to reliably decode paging channel resulting in missed pages and therefore the inability to receive terminal-terminated calls; 2) the terminal being unable to read common control channels; and 3) throughput degradation or degraded physical downlink shared channel (PDSCH) performance.

Thus, there is a need for method and apparatus that mitigates downlink control channel interference.

SUMMARY

A method and apparatus that mitigates downlink control channel interference is disclosed. The method can include receiving a transmission from a network entity and determining a first timing offset to transmit a downlink subframe based on the transmission received from the network entity. The method can include receiving an uplink transmission from a mobile terminal and determining a second timing offset based on the first timing offset and based on the received uplink transmission. The method can include transmitting a timing advance command to the mobile terminal, the timing advance command including the second timing offset.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
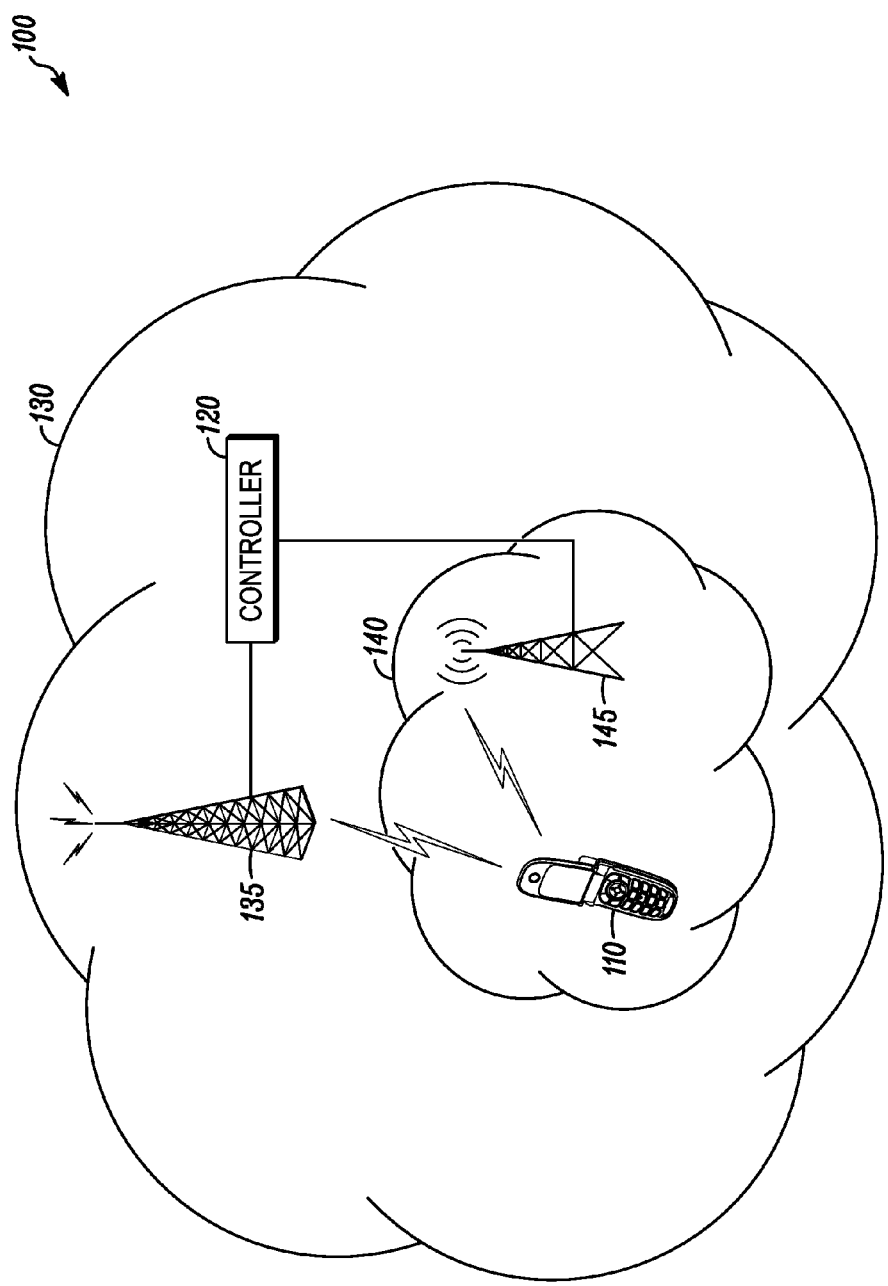
FIG. 1 illustrates an exemplary block diagram of a system in accordance with a possible embodiment.

FIG. 1 is an exemplary block diagram of a system 100 according to a possible embodiment. The system 100 can include a terminal 110, a first cell 140, a first cell base station 145, a second cell 130, a second cell base station 135, and a network controller 120. The terminal 110 may be a wireless communication device, such as a wireless telephone, a cellular telephone, a personal digital assistant, a pager, a personal computer, a selective call receiver, or any other device that is capable of sending and receiving communication signals on a network including wireless network. The first base station 145 can be a heterogeneous cell base station, such as a home base station or a relay node, and the second base station 135 can be a macro cell base station. For example, a heterogeneous cell base station can be a closed subscriber group base station, a relay node, a femtocell base station, a picocell base station, or any other base station that can be within a coverage area of a macro cell base station. As a further example, the first base station 145 can be a heterogeneous cell base station configured to operate at lower power than a macro cell base station 135 within a coverage area of the macro cell base station 135.

In an exemplary embodiment, the network controller 140 is connected to system 100. The controller 140 may be located at a base station, at a radio network controller, or anywhere else on the system 100. The system 100 may include any type of network that is capable of sending and receiving signals, such as wireless signals. For example, the system 100 may include a wireless telecommunications network, a cellular telephone network, a Time Division Multiple Access (TDMA) network, a Code Division Multiple Access (CDMA) network, a satellite communications network, and other like communications systems. Furthermore, the system 100 may include more than one network and may include a plurality of different types of networks. Thus, the system 100 may include a plurality of data networks, a plurality of telecommunications networks, a combination of data and telecommunications networks and other like communication systems capable of sending and receiving communication signals.

In operation, the heterogeneous cell base station 145 can receive a transmission from a network entity, such as the second cell base station 135 or the network controller 120. The heterogeneous cell base station 145 can determine a first timing offset to transmit a downlink subframe based on the transmission received from the network entity. The heterogeneous cell base station 145 can receive an uplink transmission from a mobile terminal 110. The heterogeneous cell base station 145 can determine a second timing offset based on the first timing offset and based on the received uplink transmission. The heterogeneous cell base station 145 can transmit a timing advance command to the mobile terminal 110, where the timing advance command can include the second timing offset.

According to a related embodiment, the heterogeneous cell base station 145 can receive a timing offset value from a network entity over a relay backhaul, such as an X2 connection. The heterogeneous cell base station 145 can offset frame timing of a downlink transmission relative to a reference timing by an amount determined from the received timing offset value. The heterogeneous cell base station 145 can transmit the downlink transmission based on the offset frame timing.

In another embodiment, the heterogeneous cell base station 145 can receive a timing offset value from a first wireless terminal operating in the same network. The wireless terminal can receive a timing offset value from a network entity such as a macro base station 135 and send a signal to the heterogeneous base station 145 indicating the received timing offset value. The heterogeneous base station 145 can use the timing offset signaled by the first wireless terminal for determining the first timing offset value. The heterogeneous base station 145 can then receive an uplink transmission from a second wireless terminal 110 and compute a second timing offset value based on the received uplink transmission and the first timing offset value. The heterogeneous base station 145 can signal a timing advance command to the second wireless 110 terminal including the second timing offset value. As another example, the wireless terminal can compute a timing offset based on a transmission from a base station and transmit information related to the timing offset to the wireless base station. As a further example, the information can be relayed information received by the wireless terminal from the network entity and relayed via an uplink to the first wireless base station.

According to another related embodiment, the second base station 135 can offset, by the second base station, downlink frame timing relative to downlink frame timing of the first base station 145. The second base station 135 can transmit information based on the offset downlink frame timing. The first base station 145 can reduce power on a set of resource elements in its downlink transmission that overlap in time and frequency with a control channel transmission. The first base station 145 can transmit information based on the reduced power.

The transmission from a second base station can be a control channel transmission, such as a physical broadcast channel (PBCH) transmission, a synchronization channel (SCH) transmission comprising one or both of a primary synchronization channel (P-SCH) and a secondary synchronization channel (S-SCH), a physical downlink control channel (PDCCH) transmission, a physical control format indicator channel (PCFICH) transmission, a physical hybrid automatic repeat request indicator channel (PHICH) transmission, a cell-specific reference signal transmission, a dedicated reference signal (DRS) transmission or another control channel transmission. In one embodiment, the second base station 135 can signal a timing advance value to a terminal 110 connected to the second base station 135 that is not less than a downlink frame timing offset between the first base station 145 and the second base station 135. In an alternate embodiment, the second base station 135 can signal a timing advance value to a terminal 110 connected to the second base station 135 that is not less than a downlink frame timing offset between the first base station 145 and the second base station 135 modulo the duration of one subframe (eg. 1 ms).

Figure 2:
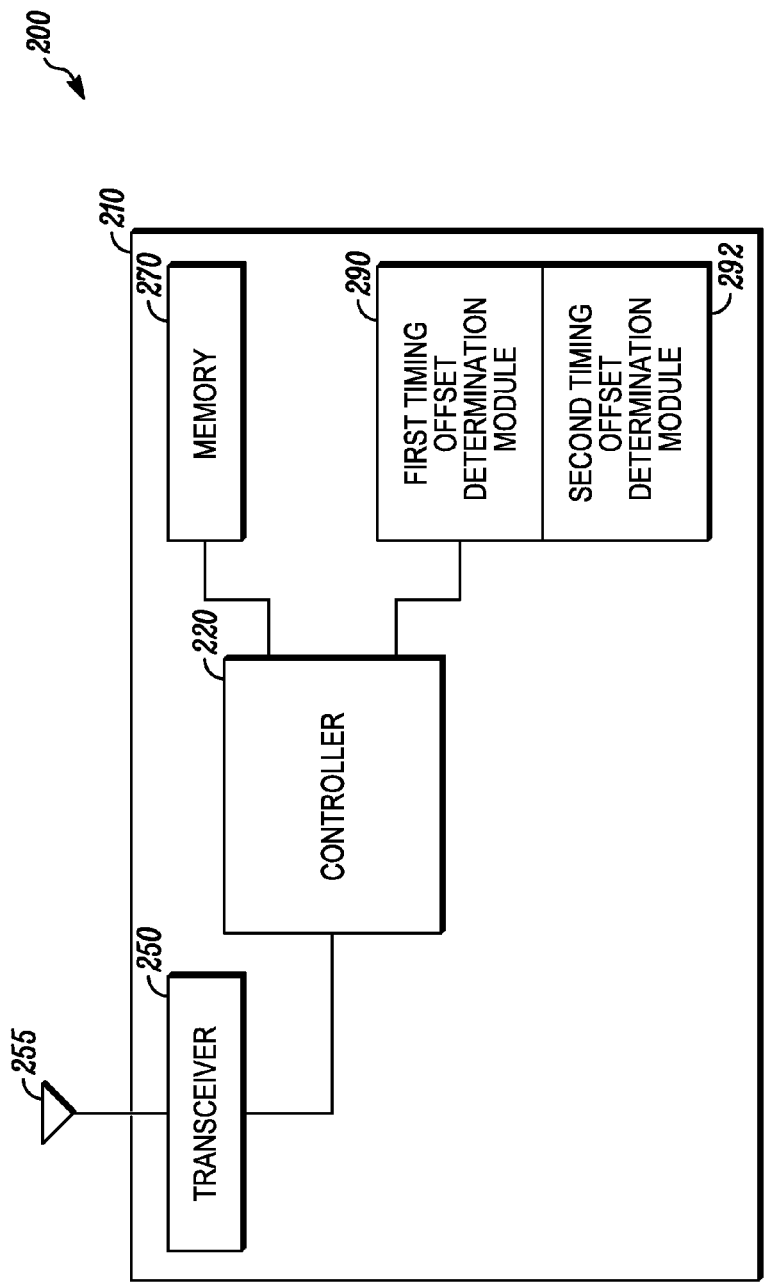
FIG. 2 is an exemplary block diagram of a wireless base station according to a possible embodiment.

FIG. 2 is an exemplary block diagram of a wireless base station 200, such as the heterogeneous base station 145, according to a possible embodiment. The wireless base station 200 can include a base station housing 210, a base station controller 220 coupled to the base station housing 210, a transceiver 250 coupled to the housing 210, an antenna 255 coupled to the transceiver 250, and a memory 270 coupled to the housing 210. The wireless communication device 200 can also include a first timing offset determination module 290 and a second timing offset determination module 292. The first timing offset determination module 290 and the second timing offset determination module 292 can be coupled to the base station controller 220, can reside within the base station controller 220, can reside within the memory 270, can be autonomous modules, can be software, can be hardware, or can be in any other format useful for a module on a wireless communication device 200. The transceiver 250 may include a transmitter and/or a receiver. The memory 270 may include a random access memory, a read only memory, an optical memory, or any other memory that can be coupled to a wireless base station.

In operation, the base station controller 220 can control operations of the wireless base station 200. The transceiver 250 can receive a transmission from a network entity, such as the network controller 120 or a second base station, like the macro base station 135. For example, the second base station can be a macro base station that indicates a first timing offset value to home base stations in its coverage area. The transmission from the network entity can be received over a backhaul, a X2 connection, a wired connection, a wireless connection, or otherwise. The transceiver 250 can receive a transmission from the second base station by receiving a synchronization channel from the second base station. For example, the synchronization channel can be a P-SCH (Primary synchronization channel) or S-SCH (Secondary synchronization channel). As a further example, the transceiver 250 can receive a transmission from the second base station by receiving a cell-specific reference signal from the second base station. As an additional example, the transceiver 250 can receive a transmission from the second base station by receiving a message over an X2 interface, the message indicating the first timing offset value from the second base station.

The first timing offset determination module 290 can determine a first timing offset to transmit a downlink subframe based on the received transmission. The first timing offset determination module 290 can determine a first timing offset by determining a first timing offset to transmit a downlink subframe based on the received transmission and based on a reference timing of the second base station. Also, the base station controller 220 can determine a special subframe configuration based on the first timing offset value.

The transceiver 250 can receive an uplink transmission from a mobile terminal, such as the terminal 110. For example, the transceiver 250 can receive an uplink transmission from the mobile terminal by receiving an uplink transmission selected from a random access channel transmission and a sounding reference signal transmission from the mobile terminal. The second timing offset determination module 292 can determine a second timing offset based on the first timing offset and the received uplink transmission. For example, the second timing offset can be a timing advance that can be a function of the distance of the terminal from the first wireless base station and can be a function of the timing offset. The transceiver 250 can transmit a timing advance command to the mobile terminal, where the timing advance command can include the second timing offset. For example, the transceiver 250 can transmit the determined special subframe configuration in a System Information Broadcast message. The determined special subframe configuration can be transmitted in a System Information Broadcast message to multiple terminals.

Figure 3:
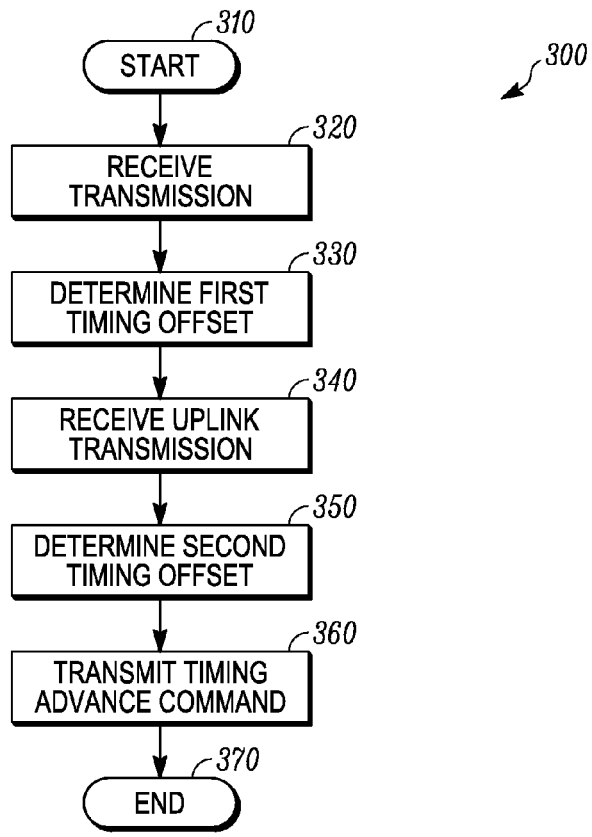
FIG. 3 is an exemplary flowchart illustrating the operation of a wireless base station according to a possible embodiment.

FIG. 3 is an exemplary flowchart 300 illustrating the operation of a wireless base station, such as the heterogeneous base station 145, according to a possible embodiment. At 310, the flowchart begins. At 320, a transmission can be received from a network entity, such as the network controller 120 or a second base station, like the macro base station 135. For example, the second base station can be a macro base station that indicates a first timing offset value to heterogeneous base stations in its coverage area. The transmission from the network entity can be received over a backhaul, a wired connection, an X2 connection, a wireless connection, or otherwise. As a further example, the transmission can be received from the second base station by receiving a synchronization channel from the second base station. The synchronization channel can be a P-SCH (Primary synchronization channel) or S-SCH (Secondary synchronization channel). As another example, the transmission can be received from the second base station by receiving a cell-specific reference signal from the second base station. As an additional example, the transmission can be received from the second base station by receiving a message over an X2 interface, where the message can indicate the first timing offset value from the second base station. Also, the transmission received from a network entity can include a timing offset value corresponding to a number of subframes to offset downlink control signal transmissions to the mobile terminal. The last example can be useful because it can enable a macro base station or a network controller to apply a common timing offset value to all the heterogeneous base stations within a certain coverage area that allows for interference reduction to control channels transmission from heterogeneous base stations. In this scenario, the macro base stations can know which set of time-frequency resources to attenuate or mute in order that the interference to control channel transmission from heterogeneous base stations can be reduced.

At 330, a first timing offset can be determined to transmit a downlink subframe based on the transmission received from the network entity. The first timing offset can be determined by determining a first timing offset to transmit a downlink subframe based on the transmission received from a network entity and based on a reference timing of the second base station. At 340, an uplink transmission can be received from a mobile terminal For example, the uplink transmission can be received from the mobile terminal by receiving a Random Access Channel (RACH) transmission or a Sounding Reference Signal (SRS) transmission from the mobile terminal.

At 350, a second timing offset can be determined based on the first timing offset and based on the received uplink transmission. For example, the second timing offset can be based on a timing advance that is a function of the distance of the terminal 110 from the heterogeneous base station 145 and a function of the timing offset. For example, a special subframe configuration can be determined based on the first timing offset value. At 360, a timing advance command can be transmitted to the mobile terminal. The timing advance command can include the second timing offset. For example, the determined special subframe configuration can be transmitted in a System Information Broadcast message. The determined special subframe configuration can be transmitted in a System Information Broadcast message to multiple terminals. Table 1 shows different possible special subframe configurations where DwPTS is the downlink pilot timeslot and UpPTS is the uplink pilot timeslot.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

For example, there are 9 configurations which can define different splits for DwPTS/guard/UpPTS. The reduced guard period (GP) can be determined according to:

GP'=GP−k*ofdm_symbol_duration, where k is the first timing offset in OFDM symbols.

The guard period should be large enough to accommodate the heterogeneous base station cell radius and the transmit-receive switching time required for terminals. For the above example, that $T_s=(1/30720000)$ s.

Table 2 shows different possible uplink-downlink configurations where D is downlink, S is special, and U is uplink.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The ratio of PDSCH energy per resource element (EPRE) to cell-specific reference signal (CRS) EPRE among PDSCH REs (not applicable to PDSCH REs with zero EPRE) for each OFDM symbol is denoted by either rho_A or rho_B according to the OFDM symbol index in LTE Release 8 specification. The power ratio rho_B can be applicable to OFDM symbols bearing cell-specific reference signal and rho_A can be applicable to OFDM symbols without and can account for the power boosting/de-boosting in reference signal and data resource elements. A third ratio, rho_C, can accommodate power reduction/muting on selected resource blocks on a symbol-by-symbol basis that is used by a base station (for example, macro base station) to reduce interference to the control transmission of a heterogeneous base station. At 370, the flowchart 300 can end.

Figure 4:
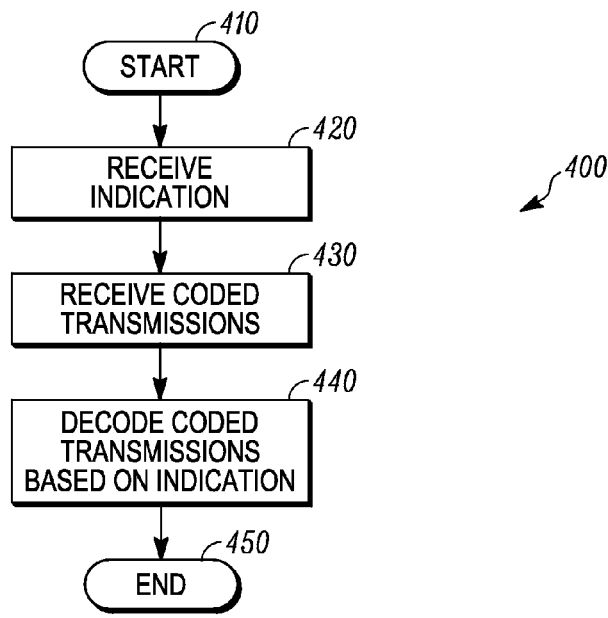
FIG. 4 is an exemplary flowchart illustrating the operation of a wireless communication device according to a possible embodiment.

FIG. 4 is an exemplary flowchart 400 illustrating the operation of a wireless communication device, such as the terminal 110, according to a possible embodiment. At 410, the flowchart begins. At 420, an indication can be received from a serving base station, such as the heterogeneous base station 145. The indication can include information that transmission power on resource elements on a set of orthogonal frequency division multiplexed (OFDM) symbols corresponding to a certain set of resource blocks is different from the transmission power outside this set. For example, the indication can be a rho_C value. As a further example, a first indication can be received from a serving base station, where the first indication can include information relating to transmission power on resource elements transmitted on orthogonal frequency division multiplexed symbols bearing cell-specific reference signal. A second indication can be received from the serving base station, where the second indication can include information relating to the transmission power on resource elements transmitted on orthogonal frequency division multiplexed symbols not bearing cell-specific reference signal. A third indication can be received from the serving base station, where the third indication can include information relating to transmission power on resources on orthogonal frequency division multiplexed symbols corresponding to a certain set of resource blocks. At 430, coded data transmissions can be received from the serving base station. At 440, the coded data transmissions can be decoded based on the indication. At 450, the flowchart 400 can end.

Embodiments can provide for time-shifting heterogeneous base station control regions relative to a macro cell's control regions and having the macro cell attenuate or mute symbol portions that overlap the heterogeneous base station control regions.

Figure 5:
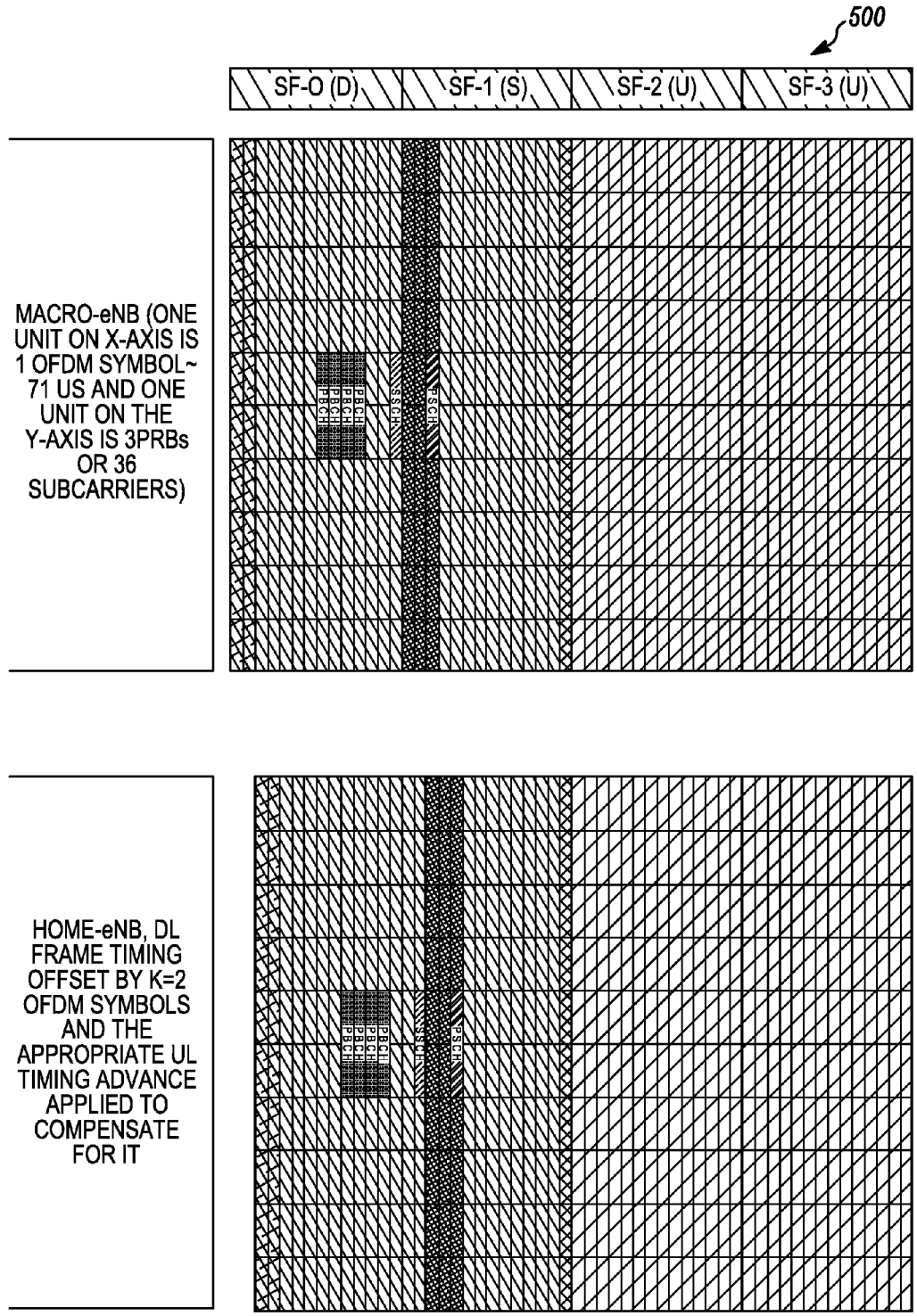
FIG. 5 is an exemplary illustration of shifting a heterogeneous base station subframe.

FIG. 5 is an exemplary illustration 500 of shifting a heterogeneous base station subframe. Frequency is based on the y-axis and time is based on the x-axis split into resource blocks. The first two symbols can represent a control region, the next 12 symbols can represent available downlink resources, the next three symbols can represent DwPTS with control region, the next ten symbols can represent a guard period (GP), the next symbols can represent UpPTS. Heterogeneous base station subframes can be shifted by k=2 symbols relative to macro base station subframes. In a related embodiment, heterogeneous base station subframes can be shifted by k=16 symbols relative to a macro base station subframe. When shifting by k=16 symbols, the heterogeneous base station synchronization channel (SCH) and physical broadcast channel (PBCH) can occur in the next subframe.

For example, carriers can be overlapped with time shifting at a symbol level for non-overlapped control. Heterogeneous base station transmissions can be time shifted by k symbols, such as to avoid overlap with macro cell base station control regions of size k, and the macro base station can perform power reduction or muting on the portion of a symbol (or symbols) that overlap the control region of the heterogeneous base station.

The macro base station can also use power reduction on all the resource blocks, such as the 25 resource blocks, overlapping the heterogeneous base station control region to improve physical downlink shared channel (PDSCH) performance for the heterogeneous base station if the heterogeneous base station is very close to the macro base station. For example, if the first base station is a home base station, a single orthogonal frequency division multiplexed (OFDM) symbol macro base station control region with n=1 can be used for PDSCH efficiency which can leave 5 control channel elements for home base station control channels, which should be sufficient for home base station control signaling.

Due to the time shift of macro base station transmissions, the last k symbols of the macro base station PDSCH region can see interference from the heterogeneous base station control region. The macro base station PDSCH overlap with the heterogeneous base station control region can be further mitigated by either (a) using truncation so that only 14-n-k symbols can be used for the macro base station PDSCH or (b) not using truncation, such as using 14-n symbols, but accounting for the overlap via modulation and coding scheme (MCS) selection.

For certain time shifts (for example, k=3 or 4), the SCH transmission from the macro base station can overlap with the PBCH transmission from the heterogeneous base station. In one embodiment, a wireless terminal can estimate the received signal corresponding to the SCH transmission from the macro base station and cancel it from the received signal so that interference to the PBCH transmission from the heterogeneous base station can be reduced.

For one embodiment, since the interference to the heterogeneous base station carrier on the macro base station packet data control channel (PDCCH) signals in the control region is being avoided by time shifting, the macro base station carrier need not be segmented. In other words, the heterogeneous base station and the macro base station can use overlapping frequency resources or even the same carrier frequency. The macro base station carrier can still be segmented. Carrier segmentation for macro base station can be also avoided in another embodiment, as shown in the illustration 500, by allocating the macro base station the full band as well, but then an additional one subframe shift with k=16 total symbols can be used so that the macro base station's shared channel and physical broadcast channel (SCH/PBCH) do not overlap with the heterogeneous base station's SCH/PBCH. Then macro base station can then mute or attenuate its PDSCH symbol(s) overlapping the heterogeneous base station control region and can also attenuate or mute the resource blocks that overlap the heterogeneous base station's PBCH/SCH.

Radio resource management (RRM) measurements of heterogeneous base station can be conducted as normal.

For example, the macro base station can be assumed to be time aligned with the macro cell. The heterogeneous base station downlink subframe can be shifted by k symbols relative to macro cell downlink subframe to avoid overlap in their control regions. The macro cell can attenuate or mute symbol(s) in its PDSCH region that overlap the heterogeneous base station control region. The macro cell can attenuate or mute physical resource blocks (PRBs) in PDSCH region that overlap the SCH or PBCH.

Figure 6:
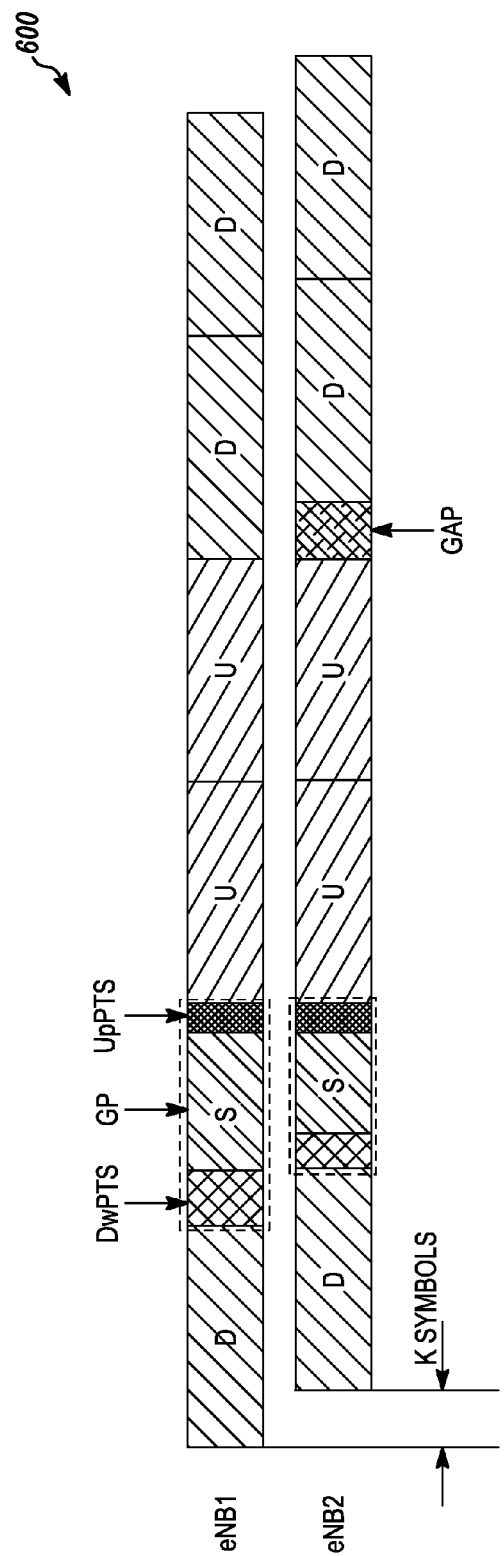
FIG. 6 is an exemplary illustration of offsetting a heterogeneous base station's frame timing relative to a macro base station.

FIG. 6 is an exemplary illustration 600 of offsetting a heterogeneous base station's frame timing relative to a macro base station by k OFDM symbols. Timing offset can be used together with uplink timing advance control. This can address the control channel interference problem in time division duplex (TDD) deployments. The illustration 600 shows a TDD configuration of downlink, special, uplink, uplink, downlink (DSUUD) with a 5 ms downlink to uplink switch point periodicity, where DwPTS represents a downlink pilot timeslot, UpPTS represents an uplink pilot timeslot, and GP represents a guard period for a macro base station (eNB1) and a heterogeneous base station (eNB2). The downlink subframes from the heterogeneous base station are offset by k OFDM symbols relative to the macro base station downlink frame timing. As in a previous example, the macro base station can perform power reduction or muting on resource elements during which the heterogeneous base station is transmitting its control signals.

A serving base station can apply an uplink timing advance to a terminal that takes into the account the propagation delay between the base station and the terminal to ensure that downlink and uplink frame timing, from the perspective of the base station antennas, are aligned. To a first order approximation, the value of the timing advance is equal to the base station-terminal propagation delay. However, the uplink transmission from a terminal attached to heterogeneous base station can potentially interfere on the macro base station downlink if a timing advance is equal to the base station-terminal propagation delay, as the macro base station downlink transmission starts k symbols earlier than the heterogeneous base station downlink transmission. To a first order approximation, if the uplink timing advance of a terminal attached to a heterogeneous base station is set to base station-terminal propagation delay+k*ofdm_symbol_duration, the terminal may not interfere with macro base station downlink transmission. This can reduces the effective guard period to GP'=GP−k*ofdm_symbol_duration The complete avoidance of terminal uplink transmission interference with the macro base station downlink may or may not possible depending on the special subframe configuration being used, such as based on the lengths of the DwPTS and the UpPTS, as it may not always be possible to satisfy the requirement that GP'>2*T_prop_max+rx-tx switch delay+k*ofdm_ symbol_duration Where T_prop_max=maximum MeNB UE propagation delay, a quantity that can depend on the macro cell size.

Figure 7:
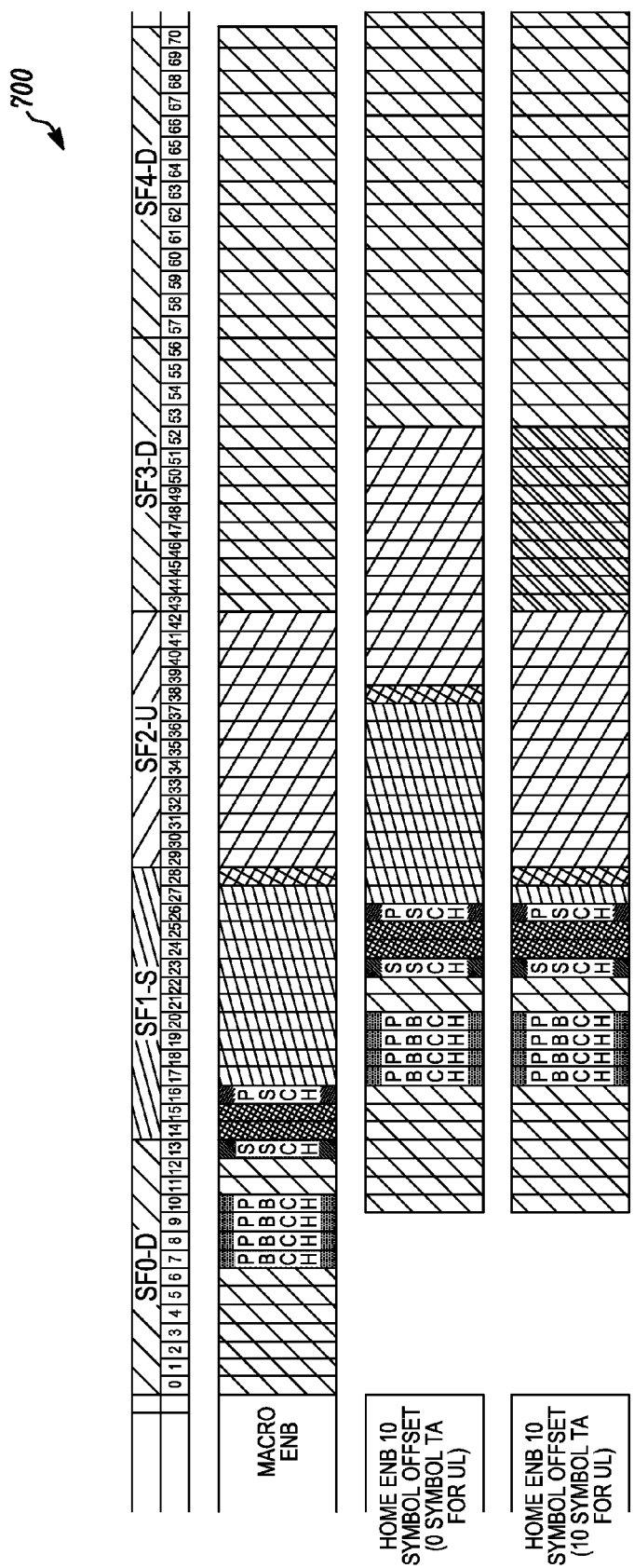
FIG. 7 is an exemplary illustration of frame timing of a heterogeneous base station offset relative to a macro base station.

FIG. 7 is an exemplary illustration 700 of frame timing of a heterogeneous base station (eNB2) offset relative to a macro base station (eNB1) by k=10 OFDM symbols. The eNB1 PBCH and P/S-SCH transmission interfering with the eNB2 PBCH and P/S-SCH can be completely avoided. However, the resulting effective guard period of one OFDM symbol period may not be sufficient for some deployments. The interference from the macro base station transmission to the PDCCH transmission from heterogeneous base station can be potentially avoided completely if k>=NCtrl2, where NCtrl2 is the number of control symbols used by the heterogeneous base station (eNB2). If k=4, the inference on P/S-SCH transmissions from eNB1 to P/S-SCH from eNB2 can be completely avoided. Also, eNB1 PBCH to eNB2 PBCH interference can be avoided. However, eNB1 S-SCH transmission with one OFDM symbol/6 PRBs can interfere with the eNB2 PBCH. The resulting effective guard period (GP') might be sufficient for most cellular deployments, such as micro-urban, small cell suburban, and other cellular deployments.

Figure 8:
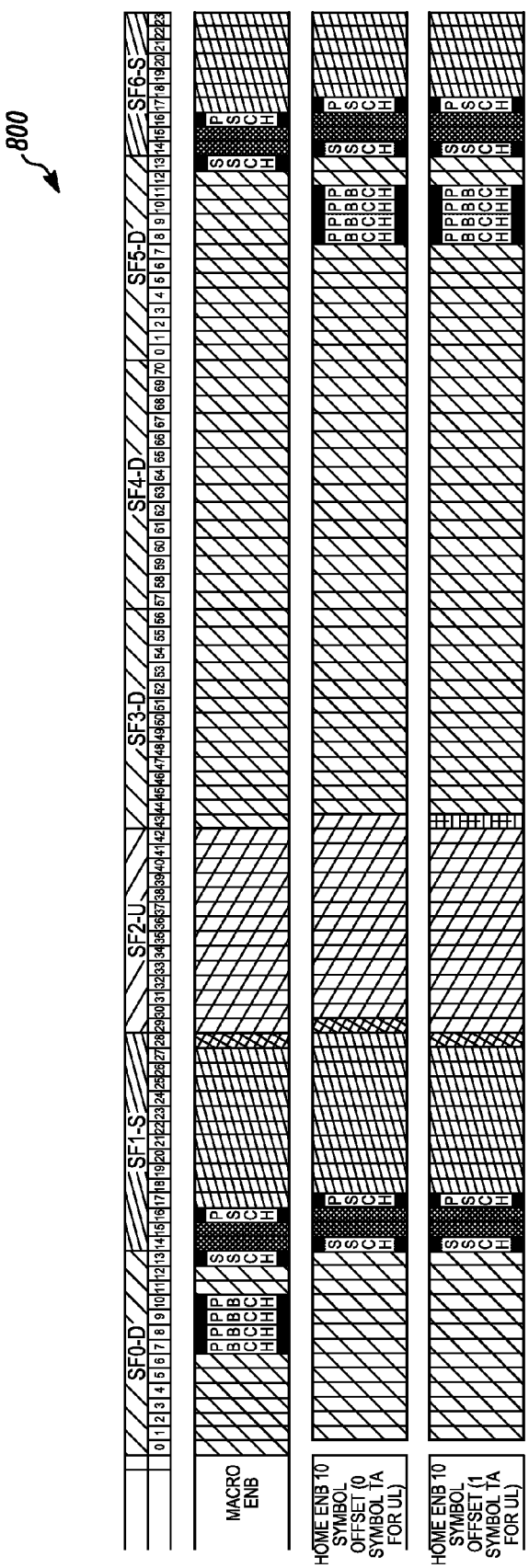
FIG. 8 is an exemplary illustration of frame timing of a heterogeneous base station offset relative to a macro base station.

FIG. 8 is an exemplary illustration 800 of frame timing of a heterogeneous base station (eNB2) offset relative to a macro base station (eNB1) by k=71 OFDM symbols. For TDD configurations with 5 ms downlink-uplink (DL-UL) switch periodicity and that have the same DL/special/UL subframe pattern in both the first and the second half of the radio frame (for example, TDD configurations 0, 1 and 2 as per Table 2), an offset equal to k=71 can be applied to eNB2 together with eNB1 muting or reduced power transmission on overlapping resources to completely avoid interference from eNB1 on PDCCH/PCFICH/PHICH/PBCH/SCH of eNB2 for the case of normal cyclic prefix subframes. For the case of extended cyclic subframes, k=61 can be applied towards the same end. This concept of a half-subframe of 5 ms plus a fractional subframe shift can be applied to TDD configuration 6 with some scheduling DL/UL restrictions on subframes 4 and 9 for either eNB1 or eNB2 or both. The eNB1 PBCH and P/S-SCH transmission interfering with eNB2 PBCH and P/S-SCH can be completely avoided. The resulting effective guard period is likely to be sufficient in most deployments. In an analogous fashion, other values of k with different levels of interference from eNB1 to eNB2 can be envisaged.

Different UL timing advance (TA) values can be needed for different eNB2s depending on the physical separation between the eNB1 and eNB2. Because the principle can be to avoid interference from a terminal attached to eNB2 transmitting on its UL on to the DL of eNB1, an eNB2 that is located far away from an eNB1, such as a heterogeneous base station at a macro cell's cell edge, may need to apply larger TA values to its terminals as compared to the TA value required for terminals connected to an eNB2 that is close to eNB1. Thus, eNB1 or the network could signal a minimum value of TA that each eNB2 needs to apply to terminals served by it. In one example, a value TA_offset can be signaled to an eNB2, and if TA_0 were the timing advance value eNB2 would have applied to a UE served by it originally, as a function of eNB2-terminal propagation delay, in order to enable the DL interference mitigation technique presented in the above embodiments, eNB2 can now apply a timing advance with a value equal to:

TA=TA_offset+TA_0

The TA_offset indicated to different eNB2s may be different as function of eNB1−eNB2 propagation delay.

For the case of in-band relay nodes, a control channel and higher layer signaling can exist between eNB1 and eNB2 over the base station-radio network (eNB-RN) backhaul. The eNB can indicate to the RN, the parameter k or alternately the amount of frame timing offset the RN should apply, such as relative to the timing of the first arriving signal path on the eNB-RN link. For the case of femto-cells and home base stations (HeNBs), an X2 link between a HeNB and a macroeNB may not exist. However, E-UTRAN architectures where an X2 or a similar link between every HeNB and either a HeNB gateway (GW) or a eNB may be used. The network can signal the timing offset parameter that a HeNB should apply to its DL transmissions, such as relative to the timing of the first arriving signal path on the eNB-RN link. For both HeNB and relay nodes (RN), the network can signal the offset that eNB2 should apply to the timing advance for its terminals. This signaling can be transported over the eNB-RN backhaul for in-band relays and over X2 or a similar interface for femto-cells/HeNBs.

In the above embodiments, a macro cell eNB1 can power down or mute transmissions corresponding to PDSCH resource elements that interfere with P/S-SCH, PBCH, and/or PDSCH transmissions from a heterogeneous cell eNB2 (RN/HeNB). The interfering eNB1 can reduce power down or mute, such as not allocate DL resources to any terminal, resource blocks (RBs) that overlap with P/S-SCH or PBCH of eNB2. For the case of PDSCH, eNB1 can statically allocate certain low interference RBs where it can either reduce power or mute so that eNB2 can schedule its users on the DL in that set.

Reducing power or muting at a RB level granularity can have an advantage that it is Rel-8 compliant. However, a certain number of RBs can have a maximum power constraint or are blocked from transmission. In order to mitigate this, power reduction or muting at a symbol level granularity can be used.

For the case of muting/down-rating power of selected resource elements (REs) when symbol level granularity is used, such as when the macro cell mutes only a few symbols over just the center 6 PRBs to avoid interfering with HeNB SCH or PBCH, power reduction/muting can be enabled with some simple signaling sent over the system information (SI) or radio resource control (RRC).

For example, for each symbol in a subframe, denote by rho_C the ratio of PDSCH energy per resource element (EPRE) for certain RBs on symbols with indices in set S to cell-specific reference signal EPRE. For each entry in set S, such as the symbol index, the start RB index and the end RB index for which rho_C is applicable can be indicated. For the remainder of the RBs, the existing Rel-8 PDSCH EPRE structure, obtained from rho_A and rho_B can be maintained. The allowed set of values for rho_C can include zero to include the possibility of muting.

Since this pattern is likely periodic, one can signal; 1) one pattern that is common to all subframes; 2) one pattern for SF#0, while the remainder of the subframes use a second pattern, such as a total of two patterns; 3) one pattern each for SF#0 or SF#5 and a third one for the remainder of the subframes for a total of three patterns; or 4) one pattern for each subframe in the radio frame. Note that the pattern repetition periodicity is 10 ms is all of the above cases. Patterns with periodicities other than the above can be envisaged.

There is no need for defining new TBS or interleaving. Since the signal indicates which set of RBs are punctured on a per-symbol basis, a simple modification can suffice to accommodate this change where for each of the antenna ports used for transmission of the physical channel, the block of complex-valued symbols $y^{(p)}(0), \ldots, y^{(p)}(M^{ap}_{symb}-1)$ can be mapped in sequence starting with $y^{(p)}(0)$ to resource elements (k, 1) which meet the following criteria: 1) they are in the physical resource blocks corresponding to the virtual resource blocks assigned for transmission; 2) they are not used for transmission of PBCH, synchronization signals or reference signals; 3) they are not in resource elements for which rho_C=0; and 4) they are not in an OFDM symbol used for PDCCH.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a wireless terminal, the method comprising:
receiving an indication from a serving base station, the indication including information relating to zero transmission power on a first set of resource elements within orthogonal frequency division multiplexed symbols of a subframe;
receiving a coded packet transmission wherein the coded packet transmission is embedded in a block of complex-valued symbols y(p)(0), . . ., y(p)(Msymb(p)−1), wherein the block of complex-valued symbols are be mapped in sequence starting with y(p)(0) to resource elements such that:
the resource elements are in the physical resource blocks corresponding to the virtual resource blocks assigned for transmission, the resource elements are not used for transmission of a physical broadcast channel, synchronization signals, or reference signals, the resource elements do not belong to a first set of resource elements that correspond to zero transmit power as suggested by the indication received from the serving base station, and the resource elements are not in an orthogonal frequency division multiplexed symbol used for a physical downlink control channel; and decoding the coded packet transmission based on the indication.

2. The method of claim 1, wherein the indication from the serving base station is received on one of a radio resource control message and a system information broadcast message.

3. The method of claim 1, wherein the indication from the serving base station includes information relating to zero power resources on orthogonal frequency division multiplexed symbols corresponding to a certain set of resource blocks.

4. The method of claim 1, wherein the indication from the serving base station includes information relating to zero power resources on a subset S of orthogonal frequency division multiplexed symbols within a subframe.

5. The method of claim 1, wherein the indication from the serving base station includes information relating to the subset S of orthogonal frequency division multiplexed symbols within a subframe.

6. The method of claim 1, wherein the indication from the serving base station is associated with a periodic subframe pattern.

* * * * *